US010719315B2

(12) United States Patent
Wright

(10) Patent No.: US 10,719,315 B2
(45) Date of Patent: Jul. 21, 2020

(54) AUTOMATIC DETERMINATION OF DEVELOPER TEAM COMPOSITION

(71) Applicant: MICROSOFT TECHNOLOGY LICENSING, LLC, Redmond, WA (US)

(72) Inventor: Ian Paul Wright, Oxford (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 207 days.

(21) Appl. No.: 15/799,056

(22) Filed: Oct. 31, 2017

(65) Prior Publication Data

US 2019/0129714 A1    May 2, 2019

(51) Int. Cl.
*G06F 8/75* (2018.01)
*G06F 8/77* (2018.01)
*G06F 16/11* (2019.01)
*G06F 8/71* (2018.01)

(52) U.S. Cl.
CPC .................. *G06F 8/77* (2013.01); *G06F 8/75* (2013.01); *G06F 16/128* (2019.01); *G06F 8/71* (2013.01)

(58) Field of Classification Search
CPC ............. G06F 11/3636; G06F 11/3466; G06F 11/3476; G06F 11/3664; G06F 11/323; G06F 8/34; G06F 8/35; G06F 8/10; G06F 8/30
USPC ........................................................ 717/102
See application file for complete search history.

(56) References Cited

U.S. PATENT DOCUMENTS

| 6,381,735 | B1  | 4/2002  | Hunt |
| 6,557,011 | B1  | 4/2003  | Sevitsky et al. |
| 8,365,286 | B2  | 1/2013  | Poston |
| 9,305,279 | B1* | 4/2016  | Menzel ..................... G06F 8/75 |
| 9,785,432 | B1* | 10/2017 | Wright ............. G06Q 10/06398 |
| 2006/0168565 | A1 | 7/2006 | Gamma et al. |
| 2007/0124202 | A1 | 5/2007 | Simons |

(Continued)

OTHER PUBLICATIONS

Naresh et al., Rank Me: A Java Tool for Ranking Team Members in Software Bug Repositories, 2012, Journal of Software Engineering and Applications, pp. 255-261. (Year: 2012).*

(Continued)

*Primary Examiner* — John Q Chavis
(74) *Attorney, Agent, or Firm* — Workman Nydegger

(57) ABSTRACT

Methods, systems, and apparatus, including computer programs encoded on computer storage media for automatically determining developer team composition. One of the methods includes obtaining a reference set of snapshots for a code base, each snapshot comprising a representation of source code of the code base at a particular time and being associated with a particular project and a particular developer of a team of developers of the code base; selecting a subset of snapshots; dividing the subset into a plurality of time windows; for each time window and for each developer that committed a snapshot to the reference collection of snapshots during the time window, determining a normalized rating of the developer's skills in each of a plurality of developer activity metrics; and aggregating, for each time window, the normalized ratings for each developer to generate a developer team composition for the fixed period of time.

20 Claims, 4 Drawing Sheets

(56) References Cited

U.S. PATENT DOCUMENTS

| | | | |
|---|---|---|---|
| 2008/0046860 A1* | 2/2008 | Kratschmer | G06F 11/008 |
| | | | 717/101 |
| 2008/0196000 A1* | 8/2008 | Fernandez-Ivern | G06F 8/20 |
| | | | 717/101 |
| 2008/0208654 A1 | 8/2008 | Nahikian et al. | |
| 2012/0047211 A1* | 2/2012 | Hughes | G06Q 30/02 |
| | | | 709/204 |
| 2012/0077174 A1* | 3/2012 | Depaul | G09B 7/02 |
| | | | 434/322 |
| 2014/0089027 A1* | 3/2014 | Brown | G06Q 10/06311 |
| | | | 705/7.15 |
| 2014/0101631 A1* | 4/2014 | Hughes | G06F 8/20 |
| | | | 717/101 |
| 2014/0282355 A1* | 9/2014 | Berry | G06F 8/70 |
| | | | 717/101 |
| 2016/0132326 A1 | 5/2016 | Henriksen et al. | |
| 2016/0162289 A1 | 6/2016 | Henriksen et al. | |
| 2017/0060578 A1* | 3/2017 | Shukla | G06F 8/77 |
| 2017/0178078 A1* | 6/2017 | Fernando | G06Q 10/1053 |

OTHER PUBLICATIONS

U.S. Appl. No. 61/983,932, Henriksen et al., filed Apr. 24, 2014.

* cited by examiner

AUTOMATIC DETERMINATION OF DEVELOPER TEAM COMPOSITION

BACKGROUND

This specification relates to static analysis of software source code.

Static analysis refers to techniques for analyzing computer software source code without executing the source code as a computer software program. Static analysis systems analyze source code to determine various properties about source code in a code base and properties of developers who commit code to the code base.

Source code is typically maintained by developers in a code base of source code using a version control system. Version control systems generally maintain multiple revisions of the source code in the code base, each revision being referred to as a commit or a snapshot. Each snapshot includes the source code of files of the code base as the files existed at a particular point in time.

Relationships among snapshots stored in a version control system can be represented as a directed, acyclic revision graph. Each node in the revision graph represents a commit of some portion of the source code of the code base. Each commit identifies source code of a particular snapshot as well as other pertinent information about the snapshot, such as the author of the snapshot and data about ancestors of the commit in the revision graph. A directed edge from a first node to a second node in the revision graph indicates that a commit represented by the first node occurred before a commit represented by the second node, and that no intervening commits exist in the version control system.

A static analysis system can analyze source code of a particular snapshot of the code base to identify characteristic segments of source code in the snapshot. For example, a static analysis system can identify violations in the source code of a particular set of coding standards. A static analysis system can also identify a responsible contributor for each characteristic segment of source code and attribute the characteristic segment to the responsible contributor, e.g., to a particular developer or group of developers.

SUMMARY

This specification describes how a static analysis system can automatically determine a developer team composition that indicates how much of multiple predetermined types of developer activities are occurring in a particular project by analyzing developers' histories and computing values of one or more metrics. Determined developer team compositions provide insights into the aggregate behavior of teams of developers.

In general, one innovative aspect of the subject matter described in this specification can be embodied in methods that include the actions of obtaining a reference set of snapshots for a code base, wherein each snapshot comprises a representation of source code of the code base at a particular time, each snapshot being associated with a particular project and a particular developer of a team of developers of the code base; selecting a subset of snapshots, wherein the subset of snapshots comprise snapshots from a fixed period of time; dividing the subset into a plurality of time windows, each time window corresponding to a respective interval of time; for each time window and for each developer that committed at least one snapshot to the reference collection of snapshots during the time window, determining a normalized rating of the developer's skills in each of a plurality of metrics, wherein each metric is associated with one or more of multiple types of developer activities; and aggregating, for each time window, the normalized ratings for each developer that committed at least one snapshot to the reference collection during the time window to generate a developer team composition for the fixed period of time, the developer team composition indicating the division of labor in the team of developers of the code base at each interval of time during the fixed period of time.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In some implementations the method further comprises, for each time window, normalizing the aggregated normalized ratings for each developer that committed at least one snapshot to the reference collection during the time window to generate a normalized developer team composition indicating proportions of developer activities performed by the team of developers at each interval of time during the fixed period of time.

In some implementations determining a normalized rating of a developer's skills in each of the plurality of metrics for each time window in the fixed period of time comprises applying a sliding window across the fixed period of time, wherein the sliding window comprises an interval of time whose center point corresponds to each time window.

In some implementations determining a normalized rating of the developer's skills in each of a plurality of metrics for each time window comprises, for each of the plurality of metrics: computing, for each developer that committed at least one snapshot to the reference collection of snapshots and for each time window, a value of the metric; determining a global minimum value and global maximum value for the metric over the team of developers and over the fixed period of time; partitioning the range of values between the determined global minimum value and global maximum value into a plurality of partitions; assigning, for each time window, each developer that committed at least one snapshot to the reference collection of snapshots to one of the plurality of partitions; and for each developer that committed at least one snapshot to the reference collection of snapshots: normalizing the values corresponding to the assigned partitions to determine normalized ratings of the developer's skills in each of the plurality of metrics for each time window.

In some implementations normalizing the values corresponding to the assigned partitions to determine normalized ratings of the developer's skills in each of the plurality of metrics for each time window comprises, for each time window: normalizing the values corresponding to the assigned partitions for each of the plurality of metrics to sum to a same fixed number.

In some implementations determining a normalized rating of the developer's skills in each of a plurality of metrics comprises one or more of: computing for the developer a respective measure of an overall performance metric including churn, wherein a unit of churn indicates a line of code added, changed, or deleted by the developer in the reference collection of snapshots; computing for the developer a respective first measure of net new violations for a first category of violation types, including comparing (i) a first measure of violations introduced by the developer that have a violation type in the first category of violation types to (ii) a second measure of violations removed by the developer that have a violation type in the first category of violation types; computing for the developer a respective second measure of net new violations for a second category of violation types, including comparing (i) a first measure of violations introduced by the developer that have a violation type in the second category of violation types to (ii) a second measure of violations removed by the developer that have a violation type in the second category of violation types; and computing for the developer a respective measure of recency, wherein a unit of recency indicates the commitment of a revised snapshot to the reference collection of snapshots by the developer in the reference collection of snapshots.

In some implementations the first category of violation types comprises bug-type violations.

In some implementations the second category of violation types comprises maintenance-type violations.

In some implementations the method further comprises determining an ideal developer team composition for the fixed period of time, the ideal developer team composition indicating how much of the developer team should be devoted to each of the multiple types of developer activities during the fixed period of time.

In some implementations determining an ideal developer team composition for the fixed period of time comprises identifying one or more user-specified thresholds for each of the multiple types of developer activities during the fixed period of time.

In some implementations the method further comprises analyzing the generated developer team composition to determine whether the generated developer team composition matches the determined ideal developer team composition.

In some implementations the method further comprises in response to determining that the generated developer team composition does not match the determined ideal developer team composition, providing as output a suggested adjustment of the developer team composition.

In some implementations the method further comprises receiving an indication of a project lifecycle stage; and based on the generated developer team composition, automatically generating a suggested developer team composition.

In some implementations the generated developer team composition for the fixed period of time comprises a graphical representation of developer team composition for the fixed period of time.

In some implementations the reference collection of snapshots for the code base comprises snapshots of a reference collection of snapshots spanning an entire project history.

In some implementations selecting a subset of snapshots comprises automatically selecting a subset of snapshots based on one or more criterion.

In some implementations the fixed period of time is smaller than a window of time that represents the entire project history.

In some implementations the fixed period of time comprises a predetermined number of days, and wherein each interval of time comprises one day.

Particular embodiments of the subject matter described in this specification can be implemented so as to realize one or more of the following advantages.

Different developer team compositions are needed at different times during a project's lifetime. A static analysis system implementing automatic determination of developer team composition, as described in this specification, may be used to help team leads and managers to make developer team assignments that are appropriate to the phase of development that the project is in. Appropriate developer team assignments may increase the efficiency at which source code is created for the project. Furthermore, appropriate developer team assignments may result in team compositions that are better suited to a type of work performed by the team, thus improving the quality of work produced by the team.

In addition, the static analysis system implementing automatic determination of developer team composition, as described in this specification, may be used to verify that an aggregate behavior of the developer team matches expectations of what sort of behavior is needed at a particular time. If the aggregate behavior of the developer team does not match the expectations of what sort of behavior is needed at a particular time, managers and team leads can investigate why, rather than continue to spend developer time on low-priority aspects of the project. Costs associated with generating source code for the project may therefore be decreased, and the time needed to generate final source code for the project may be reduced.

A static analysis system implementing automatic determination of developer team composition, as described in this specification, may be used to dynamically adjust a developer team composition for a current particular project, or may be used to adjust developer team compositions for future projects, e.g., projects that are similar to the current project, based on the current particular project. The time and costs associated with future projects as well as current projects may therefore be reduced.

A static analysis system implementing automatic determination of developer team composition, as described in this specification, may be used to adjust release dates of versions of software. For example, if a team of developers shows high levels of a particular activity, e.g., trail blazing (as defined below), and low levels of other activities, e.g., refactoring and/or bug squashing activities (as defined below), prior to a release date, this may indicate that it is likely that the software version will not be ready to be released at the designated time, e.g., since features are still being built. Conversely, if a team of developers shows high levels of refactoring and/or bug squashing and low levels of trail blazing, this may indicate that it is likely that the software version will be ready at the designated time, e.g., since features are being fine-tuned.

In addition, a static analysis system implementing automatic determination of developer team composition, as described in this specification, may provide additional insights that may help companies choose which competing versions of open-source projects to adopt as in-house technology. For example, a history of developer team composition of open-source projects may give information about (i) whether certain activities, e.g., trailblazing of new features, is still happening, (ii) a relative comparison of team effort devoted to certain activities, e.g., maintenance, bug-squashing etc. Such information can be used to determine a whether a project is worth adopting or not. For example, in some cases, a better project to adopt may be a project which shows continued trailblazing (i.e., new features still being actively developed) but with spikes of bug-squashing (i.e., periodic paying down of technical debt). In contrast, projects with little trailblazing may be either feature complete (unlikely) or stagnant (more likely).

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
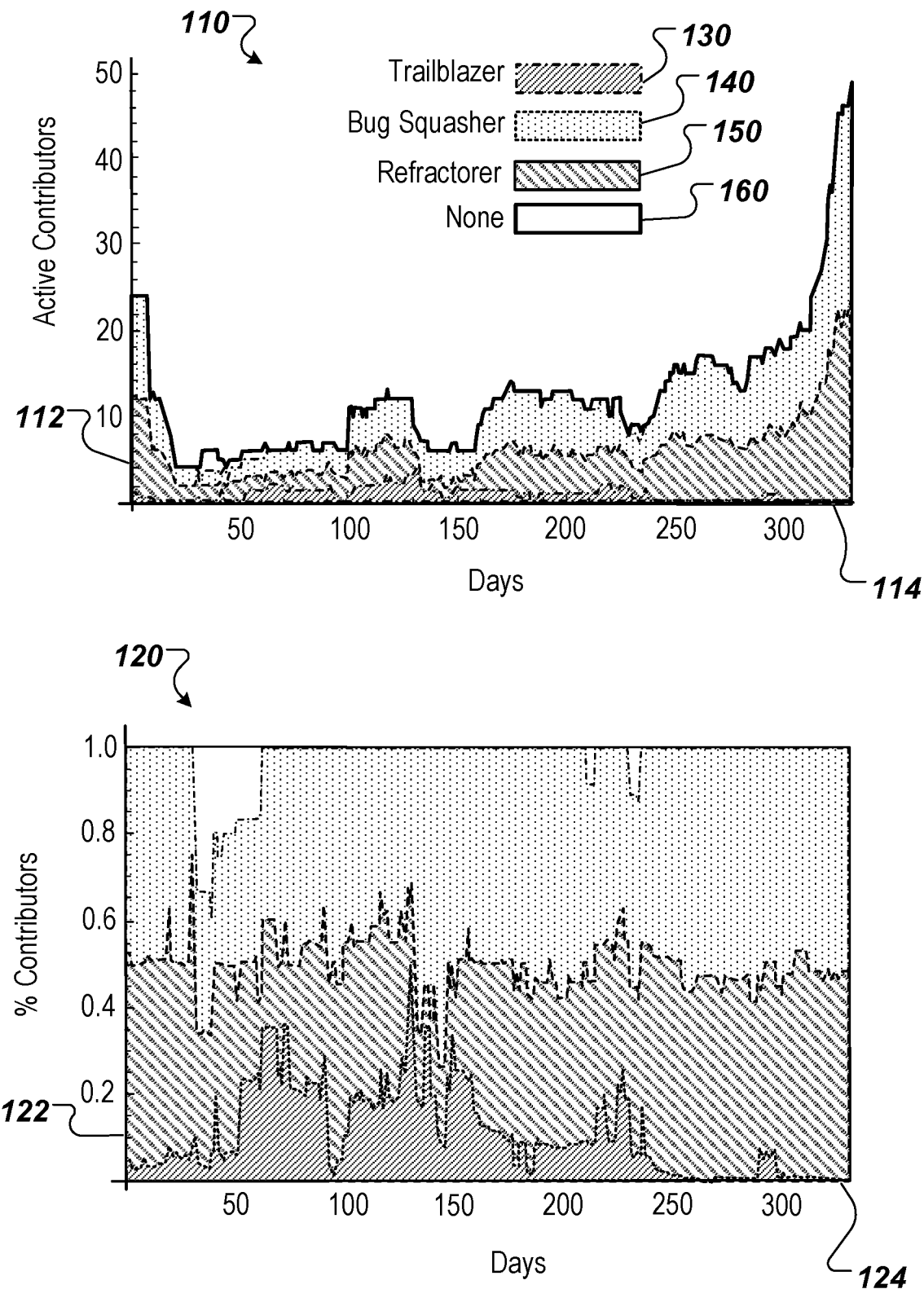
FIG. 1 illustrates an example graphical presentation of a developer team composition for a particular project over an example fixed time period.

A static analysis system can determine a developer team composition based on computing multiple metrics for each developer of a code base associated with the project. The developer team composition indicates how much of the developer team is devoted to each of multiple types of activities during a particular project over a fixed period of time.

The multiple metrics computed by the systems described below represent developer characteristics associated with particular developer skills. In this specification, where reference is made to computing a measure of a metric for a developer, the same techniques can also be applied to any appropriate aggregation of contributors of source code in the code base, e.g., a team of developers in an organization or a selected group of developers.

The metrics are associated with different types of developer activities. For example, the computed metrics may include an overall performance metric that quantifies the overall contributions by a developer. The overall performance can be churn, where a unit of churn indicates a line of code added, changed, or deleted by the developer in the reference collection of snapshots. The overall performance metric can also be net or total lines of code added, where net lines of code added is total lines of code added minus number of lines of code deleted. Other metrics include metrics representing a number of files modified, a number of commits, or any combination of measures of developer activities. Such metrics are informative and, when suitably aggregated, provide insight into team behavior. For example, when a significant proportion of developers in the team of developers is exhibiting high measures of developer activity, the project may be described as exhibiting "trail blazing" activities.

As another example, the computed metrics may include measures of net new source code violations. In general, a source code violation is a segment of source code that includes a violation of a particular coding standard. The computed metrics may include measures of net new source code violations of different violation types. For example, when a significant portion of developers in the team of developers have low or negative net new violations of a bug-fixing violation type, the project may be described as exhibiting "bug squashing" activities. Similarly, when a significant portion of developers in the team of developers have low or negative net new violations of a refactoring violation type, the project may be described as exhibiting "refactoring" activities.

As another example, the computed metrics may include measures of recency, e.g., a recency weighted measure of the number of commits to a revision control system. When a significant portion of developers in the team of developers have high numbers of recent commits, the project may be described as exhibiting "busy beaver" activities.

Further examples of computed metrics that may be used to determine developer team composition may include but is not limited to (i) proportions of a project's codebase attributable to authors, (ii) quantities of comments per line of code, (iii) measures of amounts of written test code, (iv) measures of quantities of long-term, stable code used by many subsystems, (v) quantities of code written in different languages, (vi) measures of complexity of code, (vii) densities of mathematical operations per line of code, (viii) percentages of commits that change documentation rather than code files, and, in general, (ix) the rate-of-change of any metric over time.

Different developer team compositions are needed at different times during a project's lifetime. For example, developer teams with a propensity to trailblaze are more appropriate for developing new and experimental features quickly, in order to ensure that the features deliver the right user experience. Sometimes this is prototype code, which may be thrown away, so developers may place less emphasis on code quality in this context. On the other hand, developer teams with a propensity to squash bugs are more suited to developing software prior to a software release, where a stable set of features need to be fully tested to ensure they work correctly. Finally, developer teams with a propensity to refactor code are better at the type of work needed just after a release, where there is time to devote effort to paying down some of the technical debt that may be accumulated during the effort to release a stable version of the software before a hard project deadline.

The determined developer team compositions generated by the static analysis system described in this specification can help team leads and managers make team assignments that are appropriate for the project's development phase, and to verify that the team's development time is being used as expected. For example, determined developer team compositions may be compared to ideal developer team compositions and adjusted accordingly.

FIG. 1 illustrates an example graphical presentation of a developer team composition for a particular project over an example fixed time period. As shown in FIG. 1, the example developer team composition for the particular project is shown over a fixed time period from 0 to 350 days. In this example, the 350 days represent the last 350 days of the project's lifetime. FIG. 1 includes two plots 110 and 120 that illustrate different but complementary visualizations of the same developer team composition for the particular project over the example fixed time period. For illustrative purposes, the developer team composition illustrated in plots 110 and 120 show aggregate developer behavior indicative of trail blazing activity 130, bug squashing activity 140, refactoring activity 150 and other activities 160.

Plot 110 includes an x-axis 114 representing time, measured in days, and ay-axis 112 representing a number of active contributors or developers to the project code base. Plot 110 illustrates fluctuations in the number of developers on the project, with a significant increase in the number of developers in the 50 or so days. In addition, plot 110 illustrates that during the latter half of the fixed time period, the amount of trail blazing activity performed by the developers in the team decreased, whereas the amount of bug squashing and refactoring activity performed by the developers in the team increases. These periods of increased bug squashing and refactoring skills may be due to the schedule associated with the code base, i.e., as the new project release was approaching the team of developers increased in size, and the new contributors were predominantly occupied with cleaning the source code and focused on code quality before its release.

Plot 120 includes an x-axis 124 representing time, measured in days, and a y-axis 122 representing a proportion of the activities performed by contributors or developers of the project code base. At each time step, e.g., each day, the proportion of performed activities is normalized using the size of the developer team for the time step. Plot 120 therefore provides a clear indication of which activities the developer team, as a whole, focused on during the fixed time period. For example, plot 120 illustrates an overall rise, e.g., between day 50 and 170, and decline, e.g., after day 170, in trailblazing activity. As described above, this period of decline in trailblazing activity may be due to the schedule associated with the code base.

Plots 110 and 120 may be used by project managers or team leaders to determine whether an aggregate behavior of a team of developers matches the expectations of what sort of behavior is needed at a particular time. Developer team behavior can be correlated with the development schedule, and the team composition may be adjusted accordingly. For example, a project that continues to have significant amounts of trail-blazing activity leading up to a release deadline may require adjustments of the developer team composition, e.g., to include more team members who exhibit bug squashing skills and less team members who exhibit trail blazing skills. Similarly, a project that displays a significant amount of refactoring activity at the beginning of a release cycle may require adjustments of the developer team composition, e.g., to include less developers who exhibit refactoring skills.

Figure 2:
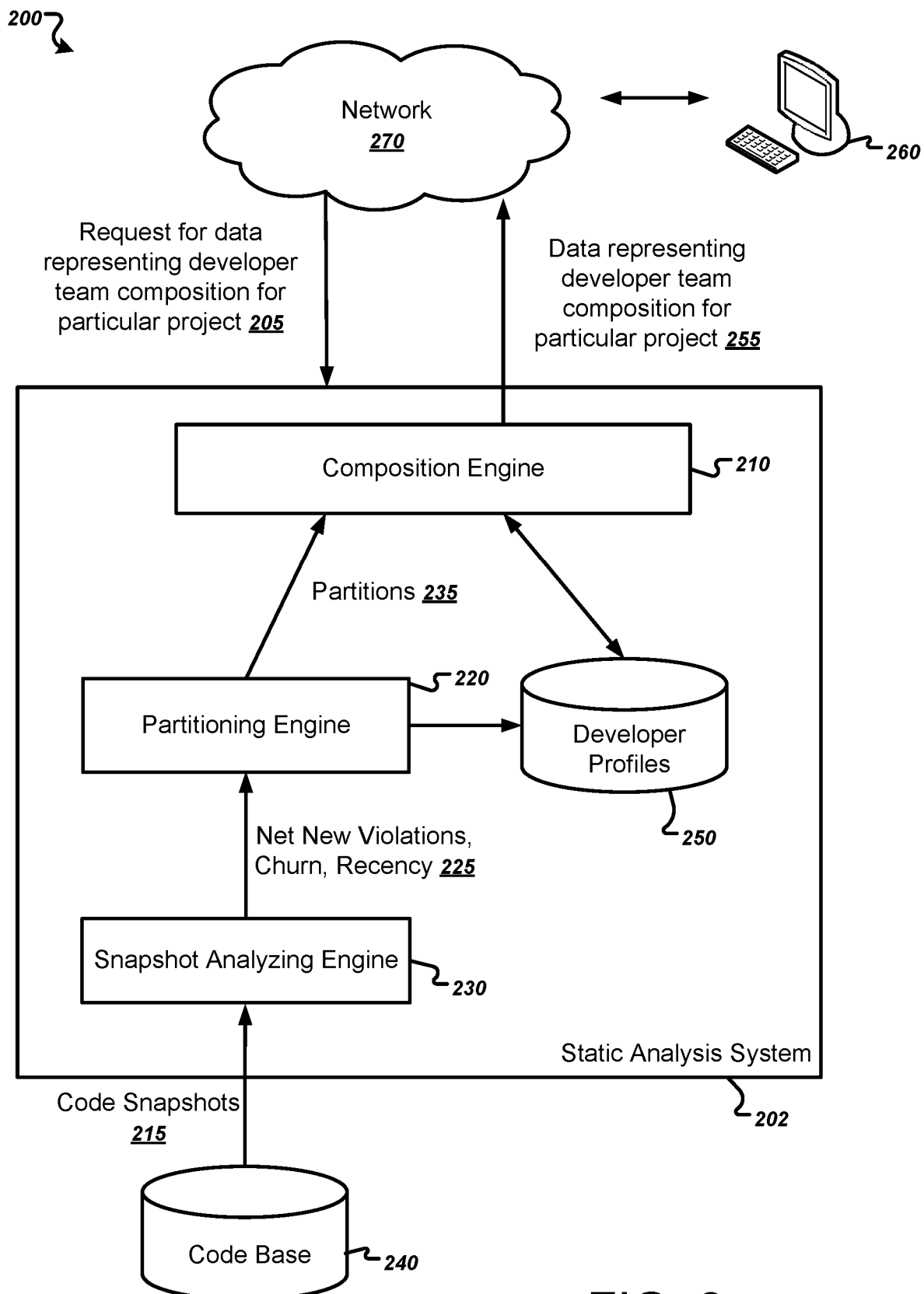
FIG. 2 is a diagram of an example system.

FIG. 2 is a diagram of an example system 200. The system 200 includes a user device 260 in communication with a static analysis system 202 over a network 270. The static analysis system 202 includes several components, including a composition engine 210, a partitioning engine 220, and a snapshot analyzing engine 230. The components of the static analysis system 202 can be implemented as computer programs installed on one or more computers in one or more locations that are coupled to each other through a network.

A user of user device 260 can use the static analysis system 202 to obtain data representing a developer team composition for particular project 255. For example, a user may wish to determine how much of certain predetermined types of developer behavior activity, e.g., "trail blazing," "bug squashing," or "refactoring," is occurring at a particular lifecycle stage of a particular project. A user can submit a request for data representing developer team composition for particular project 205 to the static analysis system 202 over the network 270, which can be any appropriate data communications network, e.g., one that includes an intranet or the Internet.

The code base 240 includes a reference collection of code snapshots, where each code snapshot includes a representation of source code at a particular time and is associated with a particular project and with a particular developer of the code base 240. The reference collection of code snapshots may include code snapshots spanning an entire project history, i.e., a project's lifecycle.

The request for data representing developer team composition for particular project 205 may specify a fixed period of time of interest for the developer team composition. In some implementations the fixed period of time may be a period of time that is smaller than a window of time that represents the entire project history, e.g., 30 days from a given start date. For example, the user may be interested in the developer team composition at a particular lifecycle stage, e.g., directly prior to a project release deadline, and specify a period of time corresponding to the lifecycle stage in the request 205. The request can also include an identifier of the code base 240 for analysis and one or more requested parameters, e.g., identifiers of a subset of developers such as a particular group or team of developers, or identifiers of a particular language of projects included in the code base 240.

The static analysis system 202 can use the snapshot analyzing engine 230 to select a subset of snapshots 215 from the code base 240 that includes snapshots from the fixed period of time specified in the request for data representing developer team composition for a particular project 205. The static analysis system 202 can further use the snapshot analyzing engine 230 to divide the subset of snapshots 215 into groups of snapshots from multiple time windows, where each time window corresponds to a respective interval of time. The multiple time windows can be overlapping or non-overlapping. For example, the snapshot analyzing engine 230 may divide a selected subset of snapshots from a time period of 500 days into 500 groups of respective snapshots from each day in the 500 days.

For each time window, the snapshot analyzing engine 230 analyzes code snapshots from the time window and computes multiple values of metrics for each developer that committed one or more of the code snapshots from the time window. In some implementations the snapshot engine 230 may analyze code snapshots from the subset of code snapshots 215 and compute multiple values of metrics for each developer that committed one or more code snapshots to the code base 240 in parallel for each time window, e.g., using a map-reduce framework.

For example, the snapshot analyzing engine 230 may compute a respective overall performance metric for each developer that quantifies the overall contributions made by a developer. The overall performance metric may include a measure of churn, where a unit of churn indicates a line of code added, changed, or deleted by the developer in the code base 240. As another example, the snapshot analyzing engine 230 may compute a respective measure of recency for each developer, where a unit of recency indicates the commitment of a revised code snapshot to the code base 240 by the developer. Each metric is associated with one or more of multiple types of developer activities. For example, a measure of churn may be associated with trail blazing activity, and recency may be associated with busy beaver activity. Example processes for computing ratings of developer skills in different developer activities are described in commonly owned U.S. patent application Ser. No. 15/290,558, for "Automatic Developer Behavior Classification," to Wright et al., which is incorporated here by reference.

The snapshot analyzing engine 230 uses the computed multiple values of metrics for each developer that committed one or more of the code snapshots and for each time window in the fixed period of time to determine global minimum and global maximum values of the each metric over the team of developers over the fixed period of time. For example, the snapshot analyzing engine 230 may use the computed values for the "trail blazing" metric, i.e., trail blazing ratings of each developer at each time window in the fixed period of time, to identify a minimum trail blazing value and a maximum trail blazing value. For example, in some cases the global minimum trail blazing value over all developers in the fixed period of time may be zero, e.g., corresponding to a window of time directly before a project release date. As another example, in some cases the global maximum trail blazing value over all developers in the fixed period of time may be significantly high, e.g., corresponding to a window of time at the beginning of a project cycle.

The partitioning engine 220 receives the computed metrics, e.g., computed measures of net new violations, overall performance metrics or recency 225, and the determined global minimum and maximum values of each metric from the snapshot analyzing engine 230. The partitioning engine 220 then partitions the range of values of the computed metrics between the determined global minimum value and maximum value into multiple respective partitions. Partitioning may include using bucket division techniques such as percentile cut offs or non-parametric clustering algorithms.

For each time window, the partitioning engine 220 then assigns each developer who committed one or more snapshots in the time window, to one of the multiple partitions for each of the computed metrics. The assigned partitions represent a skill rating for the developers. For example, if the partitioning engine 220 partitions the range of values for each computed metric, e.g., trail blazing, bug squashing and refactoring, into five partitions for a given time window, a developer who is assigned to partition five for trail blazing, three for bug squashing and one for refactoring may be described as having a 5/5 rating for trail blazing, 3/5 rating for big squashing and 1/5 rating for refactoring at the time window.

The partitioning engine 220 can store the partitions 235 representing developer skill ratings in a collection of developer profiles 250 that stores information about each developer that has contributed to the code base 240. For example, the partition engine 220 can store, for each developer in the developer profiles 250, data representing the computed metrics and composite metric for the developer and the partitions in which the computed metrics and composite metric have been assigned.

For each time window, the composition engine 210 receives data representing the partitions 235. The partitions 235 can be received from either the partition engine 220 or from the developer profiles 250. For each developer, the composition engine 210 normalizes the received data for each time window. For example, continuing the example above, the composition engine 210 may receive data indicating that, at a particular time window, a developer was assigned a 5/5 rating for trail blazing, 3/5 rating for big squashing and 1/5 rating for refactoring. In this example, the composition engine 210 normalizes the developer's ratings for the time window, such that the developer may be described as exhibiting 0.56 units of trail blazing skills, 0.33 units of bug squashing skills and 0.11 units of refactoring skills during the time window. In some cases the composition engine 210 may normalize the developers' ratings to a different, predetermined fixed number, e.g., 100.

For each time window, the composition engine 210 aggregates the normalized developer ratings to generate a developer team composition that indicates the division of labor in the team of developers of the code base at each interval of time during the fixed period of time. For example, continuing the above example, if for a given time window there were ten developers who are each described as exhibiting 0.56 trail blazing skills, 0.33 bug squashing skills and 0.11 refactoring skills, the team composition for the time window would show 5.6 units of developers exhibiting trailblazing, 3.3 units of developers exhibiting bug-squashing, and 1.1 units of developers refactoring. An example developer team composition 110 is described above with reference to FIG. 1.

In some implementations, the composition engine 210 may further or instead generate a developer team composition that indicates proportions of developer activities performed by the team of developers at each interval of time during the fixed period of time. For example, the composition engine 210 may normalize the aggregated normalized ratings for each developer for each time window, e.g., to one, to generate a normalized developer team composition. Normalizing the aggregated normalized ratings in this manner may provide a developer team composition that shows a percentage team effort devoted to each developer activity. An example normalized developer team composition 120 is described above with reference to FIG. 1.

The composition engine 210 may store generated developer team compositions, e.g., developer team compositions and/or normalized developer team compositions. In the remainder of this document, the term "developer team composition" may refer to either a developer team composition 110 or a normalized developer team composition 120, as illustrated in FIG. 1 above.

The composition engine 210 can provide data representing a developer team composition for the particular project over the fixed period of time 255 back to the user device 260 in response to the request. For example, the composition engine 210 can generate a graphical presentation, e.g., a stacked graph, of the data representing developer team composition for the particular project over the fixed period of time 255 and provide the presentation back to the user device 260 in an appropriate format, e.g., as a hypertext markup language (HTML) or Extensible Markup Language (XML) document for display by a web browser. Some implementations include an application for the user device 260 that implements a user interface and can display, in a text or graphical form, data received from the composition engine 210. For user devices that are smart phones, the application can be what is referred to as an "app."

In some implementations, the static analysis system 202 may include one or more components that are configured to determine an ideal developer team composition for a particular project over a fixed period of time. As discussed below with reference to FIG. 3, an ideal developer team composition for a fixed period of time may be used to indicate how much of a developer team should be devoted to each of multiple types of developer activities during the fixed period of time, e.g., to increase project efficiency and code quality. For example, the static analysis system 202 may be configured to receive data representing one or more predetermined, user-specified thresholds for each of the multiple types of developer activities during different stages of the project, e.g., acceptable levels or amounts of trail blazing, refactoring or bug squashing behavior at different stages of the projects. In this example, the static analysis system 202 may be configured to determine an ideal developer team composition based on the received data. As another example, the static analysis system 202 may be configured to apply machine learning techniques to determine an ideal developer team composition. For example, the static analysis system 202 may be provided with training data mapping developer team compositions for one or more previous projects to respective success scores, and may use the received training data to learn an ideal developer team composition for a particular project at given periods of time, e.g., using conventional machine learning techniques.

In some implementations, the static analysis system 202 may analyze a developer team composition generated by the composition engine 210 to determine whether a behavior of the developers of the code base matches expectations of what sort of behavior is needed at different project lifecycle stages. For example, an analyzing engine may analyze a developer team composition generated by the composition engine 210 by identifying how much of the developer team is devoted to each of the multiple types of developer activities, and comparing the identified amounts to thresholds that indicate acceptable developer team behavior.

For example, the static analysis system 202 may be configured to analyze a generated developer team composition for a particular project over a fixed period of time to determine whether the generated developer team composition matches a determined ideal developer team composition for the particular project over the fixed period of time. For example, the static analysis system 202 may compute one or more measures that indicate how the generated developer team composition time differs to the ideal developer team composition. This may include comparing values for each of multiple developer activities at each time step in the corresponding fixed period of time, e.g., comparing numbers of developers performing the multiple activities at each time step in the fixed period of time. If the difference between two values for a given time step is higher than a user-specified threshold, the static analysis system 202 may be configured to determine that the values for the time step do not match. If a total number of values that do not match over the fixed time period exceeds a predetermined threshold, the static analysis system 202 may be configured to determine that the generated developer team composition does not match the ideal developer team composition.

In response to determining that the behavior of the developers of the code base does not match expectations of what sort of behavior is needed at different project lifecycle stages, the static analysis system 202 may be configured to generate and provide as output a suggested adjustment of the developer team composition or a suggested developer team composition. For example, a suggested adjustment of the developer team composition may be an adjustment that, when implemented, causes the developer team composition to match the ideal developer team composition for the fixed period of time. In some implementations, the suggested adjustments may be based on user-specified developer team composition adjustments. For example, a user may provide the static analysis system 202 with data representing predetermined adjustments of developer team composition that may be used to correct or adjust the levels or amounts of developer activity, e.g., in the form of one or more adjustment rules. As another example, a suggested adjustment of the developer team composition may include a suggested reallocation of individual developers (who exhibit appropriate skills) between projects.

A user of user device 260 can therefore use the static analysis system 202 to obtain a suggested developer team composition for a given lifecycle stage of a particular project. For example, the user may provide the static analysis system 202 with an indication of a project lifecycle stage. In response to the received request, the static analysis system 202 may automatically generate a suggested developer team composition based on one or more generated developer team compositions. For example, the static analysis system 202 may dynamically generate a current developer team composition and generate a suggested developer team composition based on the generated current developer team composition. Alternatively or in addition, the static analysis system 202 may generate a suggested developer team composition based on stored previously generated developer team compositions corresponding to previously received user requests.

In response to determining that the behavior of the developers of the code base matches expectations of what sort of behavior is needed at different project lifecycle stages, the static analysis system 202 may provide as output a notification indicating that the behavior of the developer team is as expected.

Figure 3:
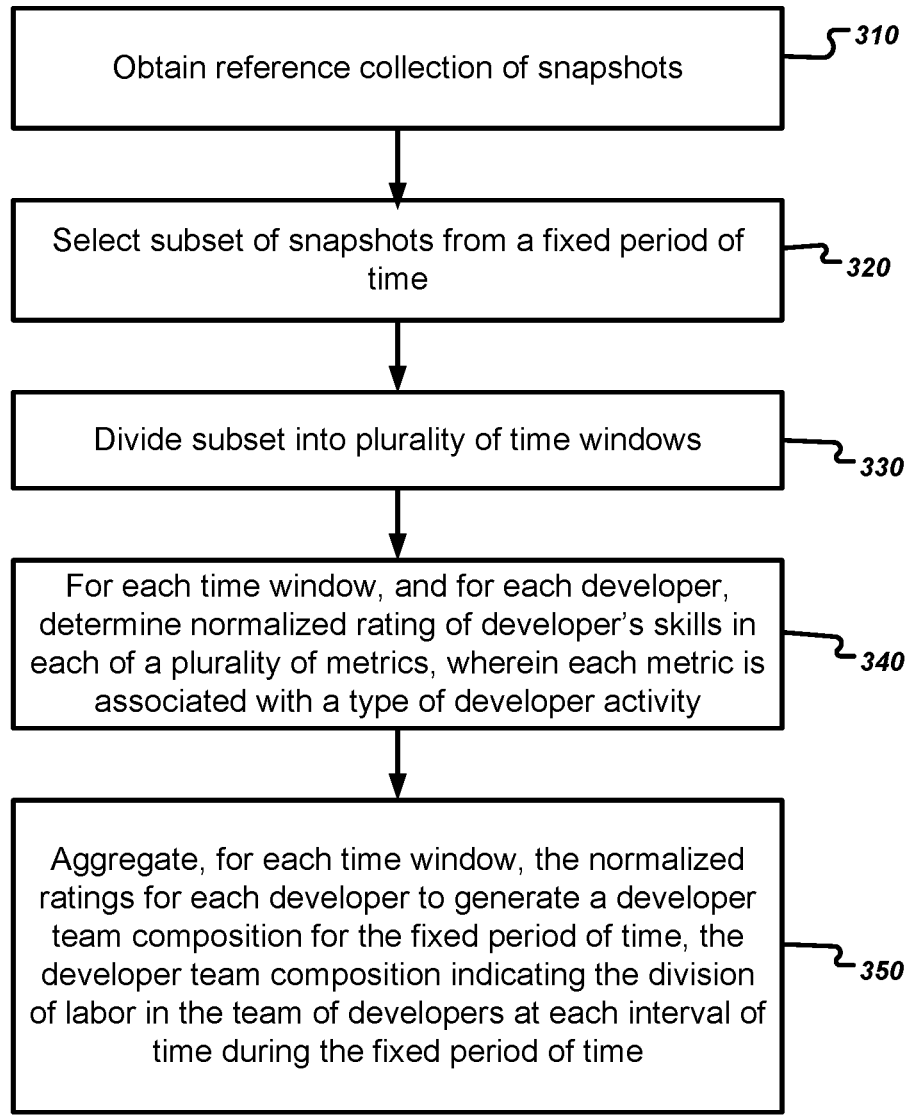
FIG. 3 is a flow chart of an example process for generating a developer team composition for a particular project.

FIG. 3 is a flow chart of an example process 300 for generating a developer team composition for a particular project. A static analysis system can obtain a reference collection of snapshots for a code base and compute one or more metrics for each developer of a team of developers that committed snapshots to the code base within a fixed period of time for a particular project. A developer team composition indicating how much of the developer team is devoted to each of the multiple types of developer activities during the fixed period of time is generated based on the computed metrics. The example process can be implemented by one or more computer programs installed on one or more computers. The process will be described as being performed by an appropriately programmed system of one or more computers, e.g., the static analysis system 202 of FIG. 2.

The system obtains a reference collection of snapshots for a code base (step 310). Each snapshot in the reference collection of snapshots includes a representation of source code of the code base at a particular time, with each snapshot being associated with a particular project and with a particular member of a team of developers of the code base. In some implementations, the reference collection of snapshots may include snapshots spanning an entire project history.

The system selects a subset of snapshots from the reference set of snapshots (step 320). As described above with reference to FIG. 2, a user of the system can submit a request for data representing a developer team composition for a particular project and can specify a fixed period of time that the developer team composition is to represent. In some implementations, the fixed period of time may be smaller than a window of time that represents the entire project history. In some implementations, the fixed period of time may include a preselected period of time, e.g., a preselected number of days. Generally, the fixed period of time is a time period over which the activity of individual members of the team of developers will be aggregated into a developer team composition that summarizes the division of labor for that time period. For example, a user of the system may specify a fixed period of time that corresponds to a preselected number of days directly prior to a project release deadline, e.g., to determine whether an aggregate behavior of the team of developers matches expectations of what sort of behavior is needed prior to a project release, such as low trail blazing activity. As another example, a user of the system may specify a fixed period of time that corresponds to a preselected number of days at a beginning of a release cycle, e.g., to determine whether an aggregate behavior of the team of developers matches expectations of what sort of behavior is needed at the beginning of a release cycle, such as low refactoring activity.

The length of the fixed time period is an adjustable parameter. For example, the length of the fixed period of time may be 500 days, however other lengths of time may be used. In some implementations, the length of the fixed period of time may depend on the amount of historical data available to the system, e.g., the number of snapshots in the reference collection of snapshots or a time period in which the snapshots in the reference collection spans.

In some implementations, the length of the fixed period of time may control an amount of smoothing of data representing information derived from the snapshots in the reference collection of snapshots for the code base, e.g., data indicating team composition. For example, in cases where the fixed period of time is one day, data representing information derived from the snapshots in the reference collection of snapshots for the code base may be jumpy. Longer fixed periods of time may be less jumpy. On the other hand, a fixed period of time that spans an entire project history will not effectively represent historical changes of developer team composition over time. Therefore, the length of the fixed period of time is preselected in such a manner that the fixed period of time is informative and can reveal trends in the developer team composition.

In some implementations, the system may automatically select a subset of snapshots, i.e., automatically select a fixed period of time, based on one or more criterion. For example, the selected subset may include (i) snapshots from a most recent predetermined time period, e.g. the last 1 month of data, (ii) snapshots from all periods of time up to 1 month prior to a release of the product, (iii) snapshots from all periods of time up to 1 month after a release of the product, or (iv) snapshots from all periods where a particular activity accounts for more than a predetermined percentage of the division of labor in the project, e.g., all periods with >45% trailblazing activity.

For each time window and for each developer that committed at least one snapshot to the reference collection of snapshots during the time window, the system determines a normalized rating of the developer's skills in each of a plurality of metrics, wherein each metric is associated with one or more of multiple types of developer activities (step 330).

As described above with reference to FIG. 2, the multiple metrics computed by the system may include, but are not limited to overall performance metrics, net violations of a bug fixing type, net violations of a refactoring/maintenance type, or recency, i.e., number and frequency of commits. Example violations of a refactoring/maintenance type include violations relating to complexity. For example, a method or constructor with high cyclomatic complexity may be difficult to understand and test. Therefore, a developer may incur a cyclomatic complexity violation if the cyclomatic complexity of a portion of code committed by the developer exceeds a predetermined acceptable cyclomatic complexity threshold. As another example, classes that have a high response can be difficult to understand and test, since it may be required to read through all methods that can possibly be called to fully understand the class. Therefore, a developer may incur a class response violation if a number of unique methods or constructors that can be called by all the methods or constructors of the class exceeds a predetermined acceptable class response threshold. As a further example, if the number of calls made by a method or constructor to other methods is high, e.g., due to the method being too large in general, the method having too many responsibilities or the method spending all it's time delegating rather than working itself, the method can be difficult to understand. Therefore, a developer may incur a number of calls in methods violation if a portion of code committed by the developer exceeds a predetermined acceptable number of calls in methods threshold.

Example violations of a bug fixing type include violations relating to logic errors. For example, violations of a bug fixing type may relate to impossible array casts. A developer may incur a bug fixing violation if a portion of code committed by the developer includes a number of impossible array casts that exceeds a predetermined acceptable number of impossible array casts. As another example, violations of a bug fixing type may relate to misleading indentations. If a control structure does not use braces, misleading indentations may make it difficult to see which statements are within its scope. A developer may incur a bug fixing violation if a portion of code committed by the developer includes a number of misleading indentations that exceeds a predetermined acceptable number of misleading indentations. As a further example, violations of a bug fixing type may relate to self-assignments. Assigning a variable to itself has no effect. Therefore, such an assignment is either completely unnecessary, or it indicates a typo or similar mistake. A developer may incur a bug fixing violation if a portion of code committed by the developer includes a number of self-assignments that exceeds a predetermined acceptable number of self-assignments.

For each time window, the system aggregates the normalized ratings for each developer that committed at least one snapshot to the reference collection during the time window to generate a developer team composition for the fixed period of time (step 340). As described above with reference to FIG. 2, the developer team composition indicates the division of labor in the team of developers of the code base at each interval of time during the fixed period of time. In some implementations, the generated developer team composition for the fixed period of time may include a graphical representation of developer team composition for the fixed period of time, e.g., a stacked graph 110 as described above with reference to FIGS. 1 and 2.

In some cases the system may generate a user interface presentation that includes information relating to the generated developer team composition for the fixed period of time. For example, the system may generate a user interface presentation that includes a graphical presentation of a developer team composition for a particular project over an example fixed time period, as shown above with reference to FIG. 1.

Optionally, the system may normalize, for each time window, the aggregated normalized ratings for each developer that committed at least one snapshot to the reference collection during the time window to generate a normalized developer team composition. As described above with reference to FIGS. 1 and 2, the normalized developer team composition indicates proportions of developer activities performed by the team of developers at each interval of time during the fixed period of time. For example, the normalized developer team composition may indicate a percentage breakdown of how much of the developer team is devoted to each of the multiple types of developer activities during the fixed period of time. In some implementations, the generated normalized developer team composition for the fixed period of time may include a graphical representation of developer team composition for the fixed period of time, e.g., a graph 120 with uniform height as described above with reference to FIGS. 1 and 2.

The generated developer team composition may be used to determine whether a behavior of the developers of the code base matches expectations of what sort of behavior is needed at different project lifecycle stages. For example, a project that continues to have trail-blazing activity prior to a release deadline may have unrealistic feature requirements, poor team communication, or some other management issue. Therefore, a user of the system may request data representing a developer team composition for a particular project over a preselected number of days prior to a release deadline, and analyze a received generated developer team composition to determine whether a behavior of developers of the code base includes trail blazing activity. In response to determining that a behavior of developers of the code base includes trail blazing activity, the user may further investigate the cause of the behavior, and take appropriate action. As another example, a project that displays high refactoring behavior at the beginning of a release cycle might have developers with a poor understanding of project priorities. Therefore, a user of the system may request data representing a developer team composition for a particular project over a preselected number of days at the beginning of a release cycle, and analyze a received generated developer team composition to determine whether a behavior of developers of the code case includes refactoring activity. In response to determining that a behavior of developers of the code base includes refactoring activity, the user may further investigate the cause of the behavior, and take appropriate action. In both examples, appropriate action may include reallocating members of the developer team, increasing the size of the developer team, adjusting project feature requirements, improving developer team communication or solving management issues. Other example actions include changing a project release date or setting explicit team composition goals.

In some implementations, the system may further determine an ideal developer team composition for the fixed period of time. An ideal developer team composition for a fixed period of time may be used to indicate how much of a developer team should be devoted to each of multiple types of developer activities during the fixed period of time, e.g., to increase project efficiency and code quality. For example, an ideal developer team composition for a fixed period of time directly prior to a release deadline may indicate that a large proportion of developer activities occurring during the fixed period of time should be dedicated to refactoring or bug squashing activities. As another example, an ideal developer team composition for a fixed period of time at the beginning of a release cycle may indicate that a large proportion of developer activities occurring during the fixed period of time should be dedicated to trail blazing activities.

In some cases, an ideal developer team composition for a particular project may be determined by one or more predetermined, user-specified thresholds for each of the multiple types of developer activities during different stages of the project, e.g., acceptable levels or amounts of trail blazing, refactoring or bug squashing behavior at different stages of the projects. For example, a user of the system may provide the system with data specifying that, within N days of a project release, bug squashing activity should account for over 50% of the aggregate developer team activity and trail blazing activity should account for between 5% and 10% of the aggregate developer team activity. As another example, a user of the system may provide the system with data specifying that, within N days from the beginning of a project release cycle, bug squashing activity should account for between 10% and 20% of the aggregate developer team activity and trail blazing activity should account for between 75% and 95% of the aggregate developer team activity.

In some implementations, the system may analyze the generated developer team composition to determine whether the generated developer team composition matches the determined ideal developer team composition. For example, the system may compute one or more measures that indicate how a generated developer team composition over a fixed period of time differs from the ideal developer team composition over the fixed period of time. This may include comparing values for each of the multiple activities at each time step in the fixed period of time, e.g., comparing numbers of developers performing the multiple activities at each time step in the fixed period of time. If the difference between two values for a given time step is higher than a predetermined threshold, the system may determine that the values for the time step do not match. If a total number of values that do not match over the fixed time period exceeds a predetermined threshold, the system may determine that the generated developer team composition does not match the ideal developer team composition. For example, for a fixed time period of N time steps, the system may determine that a generated developer team composition does not match an ideal developer team composition if, for each of the multiple activities or for a majority of the multiple activities, the difference between values for more than N/2 of the time steps do not match. In some cases, the predetermined thresholds may vary depending on the type of developer activity. For example, in some cases it may be more acceptable to have a larger difference between two values for a first type of developer activity at a given time step than a second type of developer activity at the given time step.

In response to determining that the generated developer team composition does not match the determined ideal developer team composition, the system may provide as output a suggested adjustment of the developer team composition. For example, the suggested adjustment of the developer team composition may be an adjustment that, when implemented, causes the developer team composition to match the ideal developer team composition for the fixed period of time.

In some implementations, the suggested adjustments may be based on user-specified developer team composition adjustments. For example, a user may provide the system with predetermined adjustments of developer team composition that may be used to correct or adjust the levels or amounts of developer activity, e.g., in the form of one or more adjustment rules. For example, a user may provide the system with data indicating that, in response to determining that current bug squashing activity is below a predetermined threshold of 50%, the proportion of developers exhibiting bug squashing skills should be increased to match a proportion of developers exhibiting bug squashing skills in the ideal developer team composition, e.g., by adding one developer exhibiting bug squashing skills to the developer team and removing one developer exhibiting trail blazing skills from the developer team for each percent in the difference between the expected percentage of bug squashing activity and identified percentage of bug squashing activity.

In response to determining that the behavior of the developers of the code base matches expectations of what sort of behavior is needed at different project lifecycle stages, the system may provide as output a notification indicating that the behavior of the developer team is as expected.

In some implementations generated adjustments of developer team composition may be implemented dynamically, e.g., during the lifecycle of the project, to improve the efficiency and effectiveness of the current project. For example, the system may receive an indication of a current project lifecycle stage, and based on the respective generated developer team composition, automatically generate a suggested developer team composition. In other implementations, generated adjustments of developer team composition may be used to perform adjustments for future projects, e.g., projects that are similar to the current project, to improve the efficiency and effectiveness of future projects. In some implementations generated adjustments of developer team composition may be implemented both dynamically and used to perform adjustments for future projects.

Figure 4:
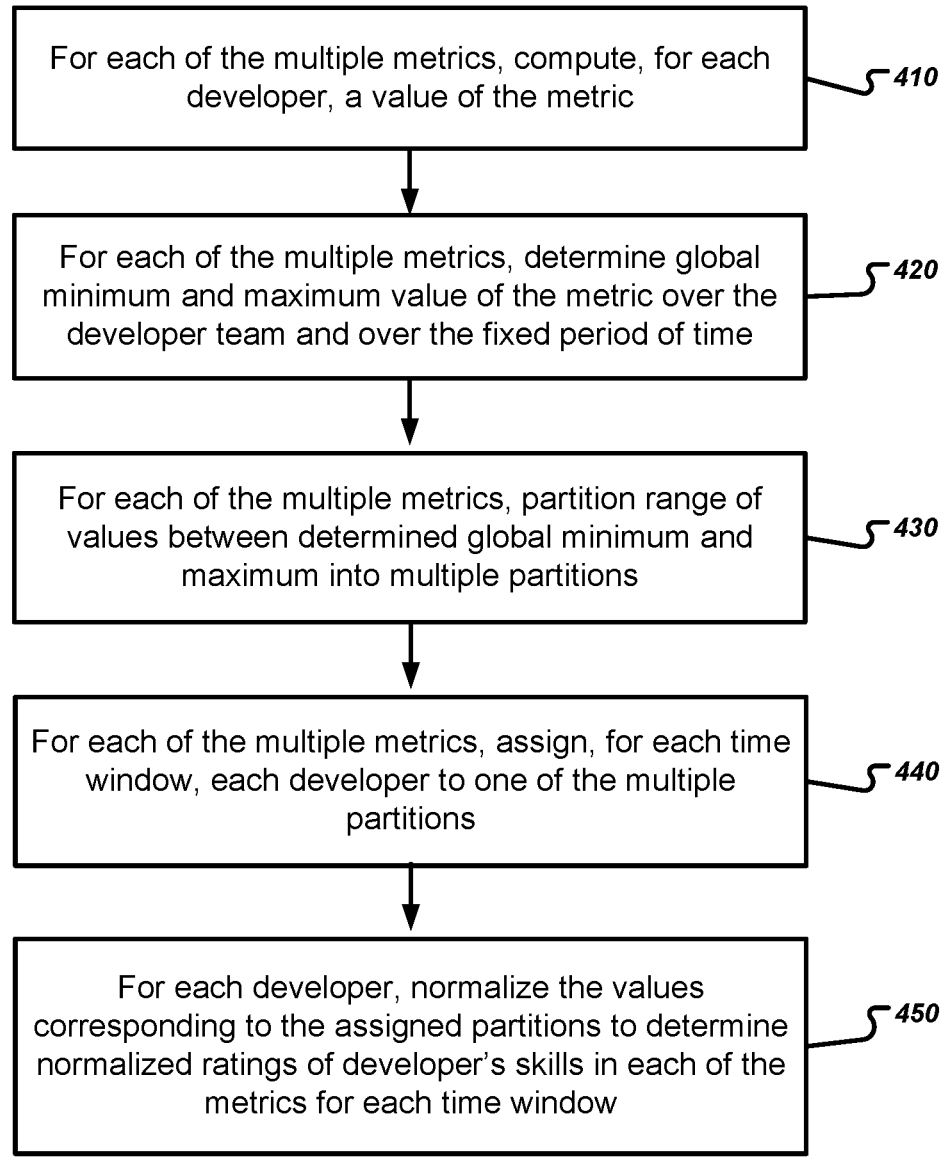
FIG. 4 is a flow chart of an example process for determining a normalized rating of a developer's skills in each of multiple metrics for a given time window.

FIG. 4 is a flow chart of an example process 400 for determining a normalized rating of a developer's skills in each of multiple metrics for a given time window. The example process 400 can be implemented by one or more computer programs installed on one or more computers. The process will be described as being performed by an appropriately programmed system of one or more computers, e.g., the snapshot analyzing engine 230 of FIG. 2.

For each of the multiple metrics, the system computes, for each developer that committed at least one snapshot to the reference collection of snapshots and for each time window, a value of the metric (step 410).

For each of the multiple metrics, the system determines a global minimum value and global maximum value for the metric over the team of developers and over the fixed period of time (step 420).

For each of the multiple metrics, the system partitions the range of values between the determined global minimum value and global maximum value into a plurality of partitions (step 430).

For each of the multiple metrics, the system assigns, for each time window, each developer that committed at least one snapshot to the reference collection of snapshots to one of the plurality of partitions (step 440).

For each of the multiple metrics and for each developer that committed at least one snapshot to the reference collection of snapshots, the system normalizes the values corresponding to the assigned partitions to determine normalized ratings of the developer's skills in each of the plurality of metrics for each time window (step 450).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments and the embodiments described above, the following embodiments are also innovative:

Embodiment 1 is a method comprising:
  obtaining a reference set of snapshots for a code base, wherein each snapshot comprises a representation of source code of the code base at a particular time, each snapshot being associated with a particular project and a particular developer of a team of developers of the code base;
  selecting a subset of snapshots, wherein the subset of snapshots comprise snapshots from a fixed period of time;
  dividing the subset into a plurality of time windows, each time window corresponding to a respective interval of time;
  for each time window and for each developer that committed at least one snapshot to the reference collection of snapshots during the time window, determining a normalized rating of the developer's skills in each of a plurality of metrics, wherein each metric is associated with one or more of multiple types of developer activities; and
  aggregating, for each time window, the normalized ratings for each developer that committed at least one snapshot to the reference collection during the time window to generate a developer team composition for the fixed period of time, the developer team composition indicating the division of labor in the team of developers of the code base at each interval of time during the fixed period of time.

Embodiment 2 is the method of embodiment 1, further comprising, for each time window, normalizing the aggregated normalized ratings for each developer that committed at least one snapshot to the reference collection during the time window to generate a normalized developer team composition indicating proportions of developer activities performed by the team of developers at each interval of time during the fixed period of time.

Embodiment 3 is the method of embodiment 1 or 2, wherein determining a normalized rating of a developer's skills in each of the plurality of metrics for each time window in the fixed period of time comprises applying a sliding window across the fixed period of time, wherein the sliding window comprises an interval of time whose center point corresponds to each time window.

Embodiment 4 is the method of any one of embodiments 1 to 3, wherein determining a normalized rating of the developer's skills in each of a plurality of metrics for each time window comprises,
  for each of the plurality of metrics:
    computing, for each developer that committed at least one snapshot to the reference collection of snapshots and for each time window, a value of the metric;
    determining a global minimum value and global maximum value for the metric over the team of developers and over the fixed period of time;
    partitioning the range of values between the determined global minimum value and global maximum value into a plurality of partitions;

assigning, for each time window, each developer that committed at least one snapshot to the reference collection of snapshots to one of the plurality of partitions; and for each developer that committed at least one snapshot to the reference collection of snapshots:

normalizing the values corresponding to the assigned partitions to determine normalized ratings of the developer's skills in each of the plurality of metrics for each time window.

Embodiment 5 is the method of embodiment 4, wherein normalizing the values corresponding to the assigned partitions to determine normalized ratings of the developer's skills in each of the plurality of metrics for each time window comprises, for each time window: normalizing the values corresponding to the assigned partitions for each of the plurality of metrics to sum to a same fixed number.

Embodiment 6 is the method of any one of embodiments 1 to 5, wherein determining a normalized rating of the developer's skills in each of a plurality of metrics comprises one or more of:

computing for the developer a respective measure of an overall performance metric including churn, wherein a unit of churn indicates a line of code added, changed, or deleted by the developer in the reference collection of snapshots;

computing for the developer a respective first measure of net new violations for a first category of violation types, including comparing (i) a first measure of violations introduced by the developer that have a violation type in the first category of violation types to (ii) a second measure of violations removed by the developer that have a violation type in the first category of violation types;

computing for the developer a respective second measure of net new violations for a second category of violation types, including comparing (i) a first measure of violations introduced by the developer that have a violation type in the second category of violation types to (ii) a second measure of violations removed by the developer that have a violation type in the second category of violation types; and computing for the developer a respective measure of recency, wherein a unit of recency indicates the commitment of a revised snapshot to the reference collection of snapshots by the developer in the reference collection of snapshots.

Embodiment 7 is the method of embodiment 6, wherein the first category of violation types comprises bug-type violations.

Embodiment 8 is the method of embodiment 6, wherein the second category of violation types comprises maintenance-type violations.

Embodiment 9 is the method of any one of embodiments 1 to 8, further comprising determining an ideal developer team composition for the fixed period of time, the ideal developer team composition indicating how much of the developer team should be devoted to each of the multiple types of developer activities during the fixed period of time.

Embodiment 10 is the method of embodiment 9, wherein determining an ideal developer team composition for the fixed period of time comprises identifying one or more user-specified thresholds for each of the multiple types of developer activities during the fixed period of time.

Embodiment 11 is the method of embodiment 9, further comprising analyzing the generated developer team composition to determine whether the generated developer team composition matches the determined ideal developer team composition.

Embodiment 12 is the method of embodiment 11, further comprising: in response to determining that the generated developer team composition does not match the determined ideal developer team composition, providing as output a suggested adjustment of the developer team composition.

Embodiment 13 is the method of any one of embodiments 1 to 12, further comprising:

receiving an indication of a project lifecycle stage; and
based on the generated developer team composition, automatically generating a suggested developer team composition.

Embodiment 14 us the method of any one of embodiments 1 to 13, wherein the generated developer team composition for the fixed period of time comprises a graphical representation of developer team composition for the fixed period of time.

Embodiment 15 is the method of any one of embodiments 1 to 14, wherein the reference collection of snapshots for the code base comprises snapshots of a reference collection of snapshots spanning an entire project history.

Embodiment 16 is the method of any one of embodiments 1 to 15, wherein selecting a subset of snapshots comprises automatically selecting a subset of snapshots based on one or more criterion.

Embodiment 17 is the method of any one of embodiments 1 to 16, wherein the fixed period of time is smaller than a window of time that represents the entire project history.

Embodiment 18 is the method of any one of embodiments 1 to 17, wherein the fixed period of time comprises a predetermined number of days, and wherein each interval of time comprises one day.

Embodiment 19 is a system comprising one or more computers and one or more storage devices storing instructions that are operable, when executed by the one or more computers, to cause the one or more computers to perform operations comprising the method of any one of embodiments 1 to 18.

Embodiment 20 is a computer program product, encoded on one or more non-transitory computer storage media, comprising instructions that when executed by one or more computers cause the one or more computers to perform operations comprising the method of any one of embodiments 1 to 18.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:
obtaining a reference set of snapshots for a code base, wherein each snapshot comprises a representation of source code of the code base at a particular time, each snapshot being associated with a particular project and a particular developer of a team of developers of the code base;
selecting a subset of snapshots, wherein the subset of snapshots comprise snapshots from a fixed period of time;
dividing the subset into a plurality of time windows, each time window corresponding to a respective interval of time;
for each time window and for each developer that committed at least one snapshot to the reference collection of snapshots during the time window, determining a normalized rating of the developer's skills in each of a plurality of metrics, wherein each metric is associated with one or more of multiple types of developer activities; and
aggregating, for each time window, the normalized ratings for each developer that committed at least one snapshot to the reference collection during the time window to generate a developer team composition for the fixed period of time, the developer team composition indicating the division of labor in the team of developers of the code base at each interval of time during the fixed period of time.

2. The method of claim 1, further comprising, for each time window, normalizing the aggregated normalized ratings for each developer that committed at least one snapshot to the reference collection during the time window to generate a normalized developer team composition indicating proportions of developer activities performed by the team of developers at each interval of time during the fixed period of time.

3. The method of claim 1, wherein determining a normalized rating of a developer's skills in each of the plurality of metrics for each time window in the fixed period of time comprises:
applying a sliding window across the fixed period of time, wherein the sliding window comprises an interval of time whose center point corresponds to each time window.

4. The method of claim 1, wherein determining a normalized rating of the developer's skills in each of a plurality of metrics for each time window comprises,
for each of the plurality of metrics:
computing, for each developer that committed at least one snapshot to the reference collection of snapshots and for each time window, a value of the metric;
determining a global minimum value and global maximum value for the metric over the team of developers and over the fixed period of time;
partitioning the range of values between the determined global minimum value and global maximum value into a plurality of partitions;
assigning, for each time window, each developer that committed at least one snapshot to the reference collection of snapshots to one of the plurality of partitions; and
for each developer that committed at least one snapshot to the reference collection of snapshots:
normalizing the values corresponding to the assigned partitions to determine normalized ratings of the developer's skills in each of the plurality of metrics for each time window.

5. The method of claim 4, wherein normalizing the values corresponding to the assigned partitions to determine normalized ratings of the developer's skills in each of the plurality of metrics for each time window comprises, for each time window:
normalizing the values corresponding to the assigned partitions for each of the plurality of metrics to sum to a same fixed number.

6. The method of claim 1, wherein determining a normalized rating of the developer's skills in each of a plurality of metrics comprises one or more of:
computing for the developer a respective measure of an overall performance metric including churn, wherein a unit of churn indicates a line of code added, changed, or deleted by the developer in the reference collection of snapshots;
computing for the developer a respective first measure of net new violations for a first category of violation types, including comparing (i) a first measure of violations introduced by the developer that have a violation type in the first category of violation types to (ii) a second measure of violations removed by the developer that have a violation type in the first category of violation types;
computing for the developer a respective second measure of net new violations for a second category of violation types, including comparing (i) a first measure of violations introduced by the developer that have a violation type in the second category of violation types to (ii) a second measure of violations removed by the developer that have a violation type in the second category of violation types; and
computing for the developer a respective measure of recency, wherein a unit of recency indicates the commitment of a revised snapshot to the reference collection of snapshots by the developer in the reference collection of snapshots.

7. The method of claim 6, wherein the first category of violation types comprises bug-type violations.

8. The method of claim 6, wherein the second category of violation types comprises maintenance-type violations.

9. The method of claim 1, further comprising determining an ideal developer team composition for the fixed period of time, the ideal developer team composition indicating how much of the developer team should be devoted to each of the multiple types of developer activities during the fixed period of time.

10. The method of claim 9, wherein determining an ideal developer team composition for the fixed period of time comprises identifying one or more user-specified thresholds for each of the multiple types of developer activities during the fixed period of time.

11. The method of claim 9, further comprising analyzing the generated developer team composition to determine whether the generated developer team composition matches the determined ideal developer team composition.

12. The method of claim 11, further comprising:
in response to determining that the generated developer team composition does not match the determined ideal developer team composition, providing as output a suggested adjustment of the developer team composition.

13. The method of claim 1, further comprising:
receiving an indication of a project lifecycle stage; and
based on the generated developer team composition, automatically generating a suggested developer team composition.

14. The method of claim 1, wherein the generated developer team composition for the fixed period of time comprises a graphical representation of developer team composition for the fixed period of time.

15. The method of claim 1, wherein the reference collection of snapshots for the code base comprises snapshots of a reference collection of snapshots spanning an entire project history.

16. The method of claim 1, wherein selecting a subset of snapshots comprises automatically selecting a subset of snapshots based on one or more criterion.

17. The method of claim 1, wherein the fixed period of time is smaller than a window of time that represents the entire project history.

18. The method of claim 1, wherein the fixed period of time comprises a predetermined number of days, and wherein each interval of time comprises one day.

19. A system comprising:
one or more processors and one or more storage devices storing instructions that are operable, when executed by the one or more processors, to cause the one or more compute, processors to perform operations comprising:
obtaining a reference set of snapshots for a code base, wherein each snapshot comprises a representation of source code of the code base at a particular time, each snapshot being associated with a particular project and a particular developer of a team of developers of the code base;
selecting a subset of snapshots, wherein the subset of snapshots comprise snapshots from a fixed period of time;
dividing the subset into a plurality of time windows, each time window corresponding to a respective interval of time;
for each time window and for each developer that committed at least one snapshot to the reference collection of snapshots during the time window, determining a normalized rating of the developer's skills in each of a plurality of metrics, wherein each metric is associated with one or more of multiple types of developer activities; and
aggregating, for each time window, the normalized ratings for each developer that committed at least one snapshot to the reference collection during the time window to generate a developer team composition for the fixed period of time, the developer team composition indicating the division of labor in the team of developers of the code base at each interval of time during the fixed period of time.

20. A computer program product, encoded on one or more hardware storage devices having stored thereon computer-executable instructions that, when executed by one or more processors of a computer system, cause the computer system to perform operations comprising:
obtaining a reference set of snapshots for a code base, wherein each snapshot comprises a representation of source code of the code base at a particular time, each snapshot being associated with a particular project and a particular developer of a team of developers of the code base;
selecting a subset of snapshots, wherein the subset of snapshots comprise snapshots from a fixed period of time;
dividing the subset into a plurality of time windows, each time window corresponding to a respective interval of time;
for each time window and for each developer that committed at least one snapshot to the reference collection of snapshots during the time window, determining a normalized rating of the developer's skills in each of a plurality of metrics, wherein each metric is associated with one or more of multiple types of developer activities; and
aggregating, for each time window, the normalized ratings for each developer that committed at least one snapshot to the reference collection during the time window to generate a developer team composition for the fixed period of time, the developer team composition indicating the division of labor in the team of developers of the code base at each interval of time during the fixed period of time.

* * * * *